(12) United States Patent
Atkins et al.

(10) Patent No.: US 7,995,477 B2
(45) Date of Patent: Aug. 9, 2011

(54) COLLECTING NETWORK TRAFFIC INFORMATION

(75) Inventors: Paul Atkins, Edinburgh (GB); Paul Aitken, Peebleshire (GB); Andrew G. Johnson, Scottish Borders (GB); Dimitri Bouianovski, Ottawa (CA); Benoit Claise, Crisnee (BE)

(73) Assignee: Cisco Technology, Inc., San Jose, CA (US)

( * ) Notice: Subject to any disclaimer, the term of this patent is extended or adjusted under 35 U.S.C. 154(b) by 334 days.

(21) Appl. No.: 11/746,037

(22) Filed: May 8, 2007

(65) Prior Publication Data

US 2008/0279111 A1 Nov. 13, 2008

(51) Int. Cl.
*H04L 12/26* (2006.01)
(52) U.S. Cl. ........ 370/235; 370/252; 370/389; 370/469; 709/224
(58) Field of Classification Search .................. 370/230, 370/235
See application file for complete search history.

(56) References Cited

U.S. PATENT DOCUMENTS

| 2004/0105392 A1* | 6/2004 | Charcranoon | 370/252 |
| 2004/0151117 A1* | 8/2004 | Charcranoon | 370/235 |
| 2005/0276230 A1* | 12/2005 | Akahane et al. | 370/252 |

OTHER PUBLICATIONS

Y. Rekhter et al., "A Border Gateway Protocol," IETF Request for Comments (RFC) 1771, Mar. 1995, 47 pages.
Anonymous, "Introduction to Cisco IOS Netflow," published by Cisco Systems, Inc., San Jose, California, 2007, 17 pages.
G. Sadasivan et al., "Architecture for IP Flow Information Export," published by The Internet Society, draft-ietf-ipfix-architecture-12, Sep. 6, 2006, 26 pages.

* cited by examiner

*Primary Examiner* — Jason E Mattis
*Assistant Examiner* — Maria L Sekul
(74) *Attorney, Agent, or Firm* — Hickman Palermo Truong & Becker LLP

(57) ABSTRACT

An apparatus and method for collecting network traffic information is arranged to receive network traffic elements including one or more key fields having respective key field values. The apparatus and method further classify received network traffic elements into one of a plurality of flows dependent on the key field value of one or more key fields defined by a flow profile. The method and apparatus are further configurable to vary the flow profile, create a flow record and export the flow record to a collecting node.

19 Claims, 5 Drawing Sheets

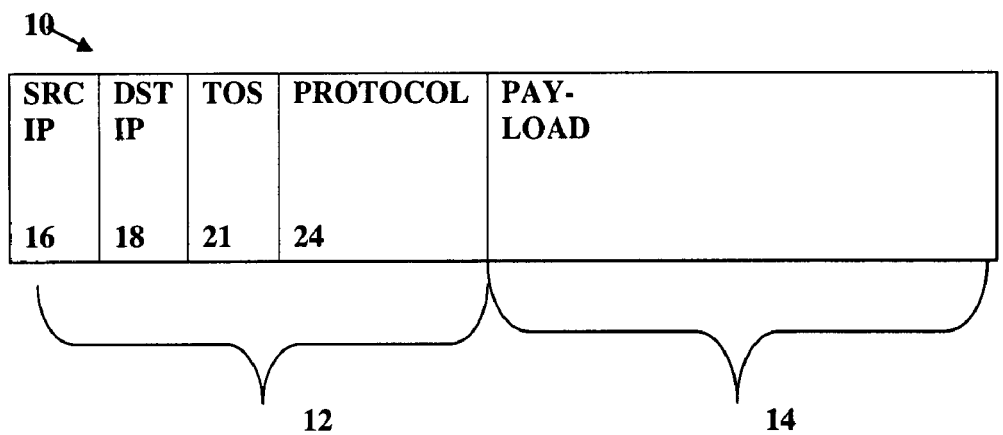
FIG. 1A
FIG. 1B
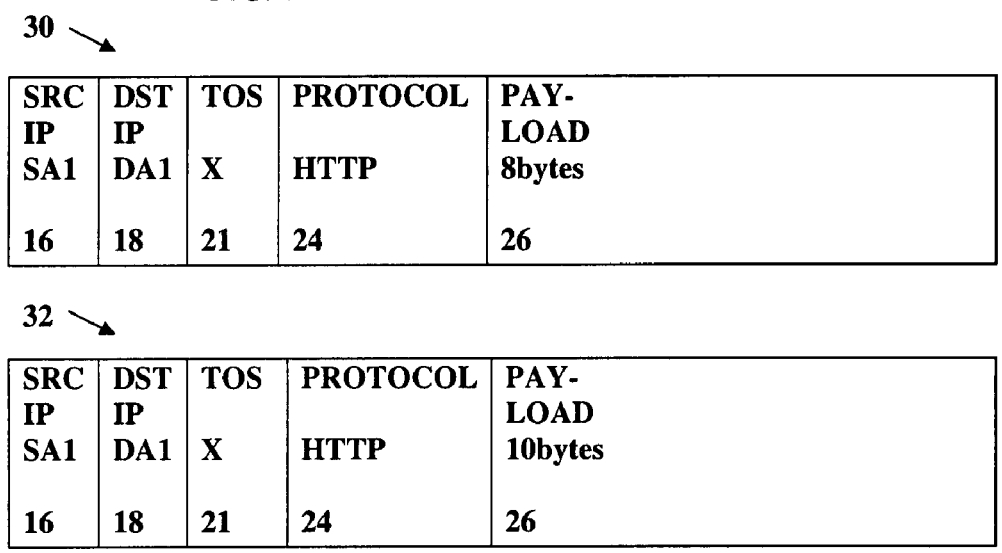
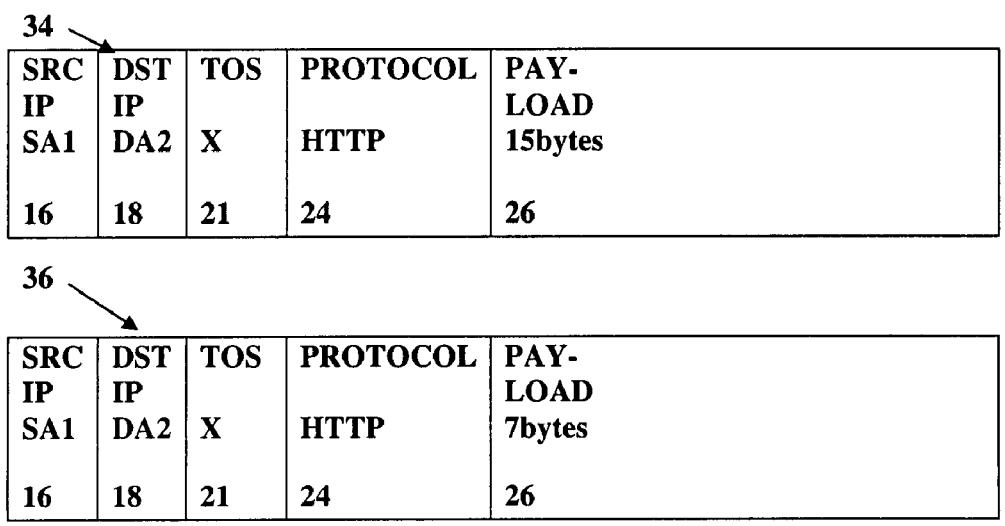

| SRC IP | DST IP | TOS | PROTOCOL | FLOW COUNT | SIZE |
|---|---|---|---|---|---|
| SA1 | DA1 | X | HTTP | 2 | 18bytes |
| 16 | 18 | 21 | 24 | 25 | 27 |

38

| SRC IP | DST IP | TOS | PROTOCOL | FLOW COUNT | SIZE |
|---|---|---|---|---|---|
| SA1 | DA2 | X | HTTP | 2 | 22bytes |
| 16 | 18 | 21 | 24 | 25 | 27 |

40

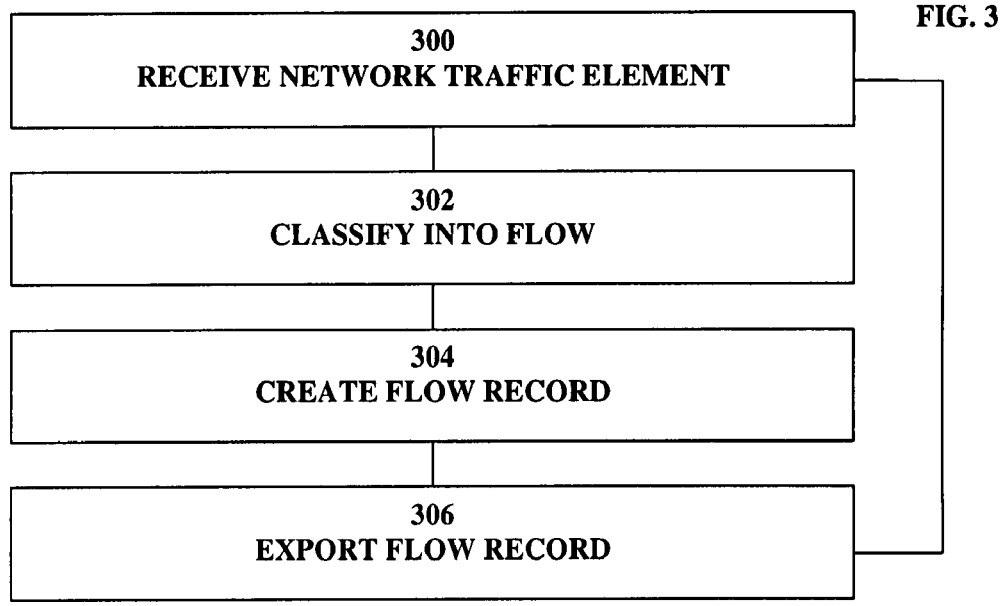
FIG. 3
FIG. 4
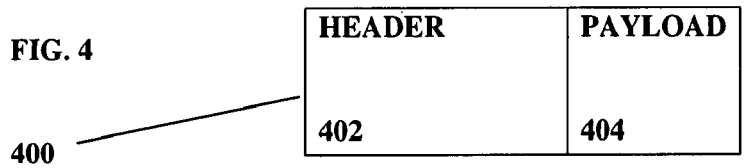
|  | KF1 506 | ... | KFN' 508 | NKF1 510 | ... | NKFN" 512 |
|---|---|---|---|---|---|---|
| FLOW 1 502 | | | | | | |
| ... | | | | | | |
| FLOW N 504 | | | | | | |
500
FIG 5

US 7,995,477 B2

COLLECTING NETWORK TRAFFIC INFORMATION

TECHNICAL FIELD

The present invention generally relates to network traffic. The invention relates more specifically to a method and apparatus for collecting network traffic information.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols. Elements in the network are typically identifiable by a unique internet protocol (IP) address.

One routing protocol used, for example, in the internet is Border Gateway Protocol (BGP). BGP is used to route data between autonomous systems (AS) comprising networks under a common administrator and sharing a common routing policy. BGP routers exchange full routing information during a connection session for example using Transmission Control Protocol (TCP) allowing inter-autonomous system routing. The information exchanged includes various attributes including a next-hop attribute. For example where a BGP router advertises a connection to a network, for example in a form of an IP address prefix, the next-hop attribute comprises the IP address used to reach the BGP router.

Within each AS the routing protocol typically comprises an interior gateway protocol (IGP) for example a link state protocol such as open shortest path first (OSPF) or intermediate system-intermediate system (IS-IS).

Where the network carries different types of traffic, for example email or video traffic, this may be handled by separate processes or ports on network components.

It is desirable in many instances to monitor the flow of network traffic for various purposes such as security and billing. The information derived can be used to identify, for example, "top talkers", that is, the noisiest protocol or most prolific addresses used, for network profiling, traffic analysis or for security purposes such as attack mitigation.

One way of monitoring the flow of network traffic is to categorize data packets forming the traffic as one of a plurality of "flows". According to this approach packets with common characteristics or key fields are grouped together as a flow. One example of such an approach is the NetFlow™ product which is a feature of Cisco IOS® software available from Cisco Systems, Inc, San Jose, Calif., USA.

According to this approach, packets having a common value for a set of key fields such as source interface, destination interface, IP source address, IP destination address, IP type of service (ToS), network layer (UDP/TCP) source port, and network layer (UDP/TCP) destination port are classified into a flow, the relevant key fields defining the flow profile. Information relating to the flow is stored in a flow record and includes information about the key fields and their values as well as non-key field information or values such as how many packets and bytes are seen in that flow together with other routing information or field values.

An element such as a monitor performs the overall process and includes one or more Observation Points such as data (packet/flow) collection points within a router through which the packets pass. The key fields can be hard coded into the device for example in a flow accounting implementation Non-key field information is also collected at the monitor according to a set of fixed data plus, optionally, a choice from a small list of additional available information. The collected information for example in the form of flow records is gathered for example at a remote collector node from one or more data collection sites for the purposes of analysis of the collected data.

BRIEF DESCRIPTION OF THE DRAWINGS

In the drawings:

FIG. 1A is a schematic diagram showing a packet format;

FIG. 1B is a schematic diagram showing packets to be classified into a flow record;

FIG. 3 is a flow diagram illustrating at a high level steps performed at a router according to the method described herein;

FIG. 4 is a diagram representing a packet received at a router;

FIG. 5 is a diagram showing a flow record for export to a collector node according to the method described herein;

DETAILED DESCRIPTION

A method and apparatus for collecting network traffic information are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Apparatus and method for collecting network traffic information
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, an apparatus for collecting network traffic information, the apparatus being arranged to received a network traffic element including one or more key fields having a respective key field value, the apparatus being further arranged to classify received network traffic elements into one of a plurality of flows dependent on the key field value of one or more key fields defined by a flow profile, the apparatus being configurable to vary the flow profile, the apparatus being further arranged to create a flow record and export the flow record to a collecting node.

In other aspects, the invention encompasses a computer-implemented method and a computer-readable medium configured with the functions of the foregoing apparatus.

2.0 Structural and Functional Overview

Figures 1C, 2:
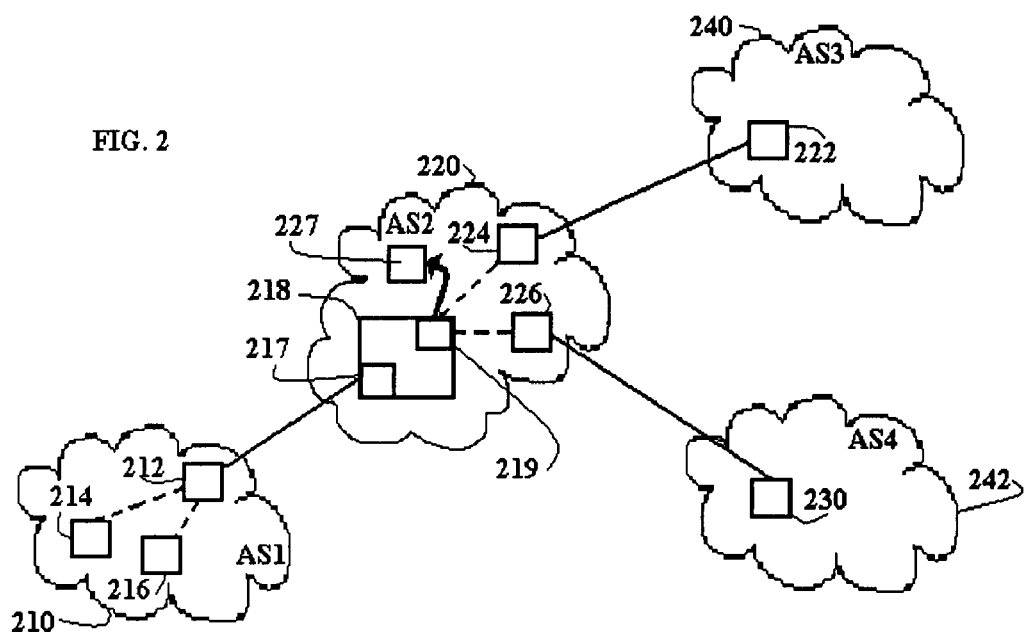
FIG. 1C is a schematic diagram showing a flow record for the packets of FIG. 1B.
FIG. 2 is a representation of a network in which traffic flows are aggregated.

FIG. 1A, FIG. 1B and FIG. 1C are schematic diagrams showing packets and classification of packets into flows according to a flow profile. Referring first to FIG. 1A, a packet 10 is shown having a header 12 and a payload 14 (not shown to scale in terms of number of bits). The header 12 includes various fields including source IP address 16, destination IP address 18, ToS 21 and protocol 24.

In FIG. 1B and FIG. 1C, four packets 30, 32, 34, 36 are classified into two flows 38, 40. The first flow, 38 comprises two packets, 30, 32 with common source IP address SA1, destination IP address DA1, ToS "X" HTTP protocol, respective payloads 26 of size 8 bytes and 10 bytes. As a result the size of the first flow 30 is recorded as two fields containing a count of the number of packets "FLOW COUNT" 25 and a count of the number of bytes "SIZE" 27, in this case: two packets and 18 bytes. A second flow 40 comprises packets 34, 36, having source IP address SA1, destination IP address DA2, ToS "X", HTTP protocol, respective payloads of size 15 bytes and 7 bytes. As a result the flow 40 is of size two packets and 22 bytes.

The caching of flows requires significant storage requirements as a result of which the cached flows are periodically exported to a collection device for example a remote node termed a "collector" node. Export can take place upon various criteria being fulfilled. For example if a flow is continuing then cached entries for the flow can be exported upon expiry of a timer. If a flow is dormant for a predetermined period or terminated (for example the TCP connection is terminated), again the entries can be exported to a collector. At this time the exported flows can be aggregated according to one of various schemes in existing systems. For example flows can be grouped together with common source and destination AS and interface, the aggregation scheme further containing a record of the number of packets, number of flows, number of bytes and time stamp of first and last packets in the aggregation. Other schemes have been adopted including prefix aggregations, port or protocol aggregations or type of service (ToS) aggregations.

In overview, a method and apparatus for collecting network traffic information according to the approach described herein can be understood with reference to FIG. 3, FIG. 4, and FIG. 5. FIG. 3 is a flow diagram illustrating at a high level steps involved in the approach described herein. FIG. 4 illustrates a packet comprising a network traffic element. FIG. 5 is a diagram illustrating a flow record for export to a collector node.

According to the approach described herein, a configurable method of specifying the exact criteria which defines the data flow through a classifying node such as a router having a monitor and one or more Observation Points is provided. This allows configuration of the flow criteria for example the flow profile determining packet classification into the flow records and additional information which is gathered from packets in each flow.

Referring to FIG. 3, an apparatus for collecting network traffic information comprises a router having a flow monitor or Observation Point. At step 300 the apparatus is arranged to receive a network traffic element such as a packet having configurable key fields such as source or destination interface, source or destination IP address, ToS, source or destination port an IP address and so forth and corresponding key field values. The key fields may also comprise time of receipt of one or more of the packets in the flow or any other appropriate field as described in more detail below. In addition the network traffic element may optionally include one or more non key fields which may also be selected from the same set of candidate fields as the key fields or comprise additional information such as a segment of the packet payload itself.

In FIG. 4 a packet 400 such as an IP packet is shown including a header 402 and a data payload 404. Each may include key fields and non key fields as well as fields that are neither.

At step 302 (FIG. 3) the node classifies the packet into one of a plurality of flows dependent on the key field value of one or more key fields defined by a flow profile. At step 304 a flow record is created (or updated) for example including key field values and non key field information and which can relate to one or more packets within the flow.

In FIG. 5, a flow record 500 includes a plurality of flows 1 to N (reference 502, 504). Each flow has its own set of key field values for the selected key fields defined by the profile, in this case KF1 to KFN' (reference 506, 508). In addition each flow may include additional flow information from non-key fields NKF1 to NKFN" (reference 510, 512).

According to the approach described herein the fields and values defining the flow, for example the flow profile, can be varied by configuration by defining which fields in or relating to the packets traveling through the router are to be regarded as key fields KF1 to KFN and which are to be regarded as non-key fields NKF1 TO NKFN. Data packets with the same unique values for the key fields will belong in the same flow. For example the key field and/or non key fields can be selected from one or more possibly available candidate fields including key fields and non key-fields and the configuration can be performed by a user or automatically for example the configuration can be saved and loaded on to the router at restart or can be pre-written and pushed on to a router. Alternatively again new configurations can be fed back from the analysis device based on user actions or pre-configured requirements triggered by predetermined conditions.

In addition the list of non-key information carried in the packet that can be gathered per flow can be configured. The non-key fields can also be selected from the same candidates as the key fields and either type of field can, for example, include a segment of the payload itself, sometimes termed a "packet chunk" or "packet sections". Non-key field information such as source address or TOS collected from the first packet seen in the flow may in many cases be used for all packets in the flow This may include other flow information such as packet and byte counters.

At step 306 the flow record is exported to a collector node and the process loops back to step 300 although in practice it will be appreciated that multiple packets can be processed in any appropriate order. As described in more detail below, the flow information may be collected at one or multiple different monitors each having one or more Observation Points and optionally using different flow profiles and hence creating different flow records. In one embodiment the Observation Points may be at one or both of the input interface and output interface on the router, for example as described below in relation to FIG. 2. The same packet may be classified into multiple flows by respective monitors.

As a result of this approach a flexible way of defining what information is gathered and how that information is aggregated into flows is provided to allow inter alia optimization of export bandwidth and optimized memory and processor usage. As a result the user can select exactly what information is gathered and sent for analysis for example when requirements change such that the criteria for defining a flow change as well. As a result there is no requirement to update a product line by changing hard coded values by the vendor which would otherwise mean the customer needs are not met for at least a full product release cycle. Furthermore the approach described herein allows the varying needs of different customers to be met simultaneously by providing the flexibility of a configurable flow profile.

3.0 Method and Apparatus for Collecting Network Traffic Information

Figure 6:
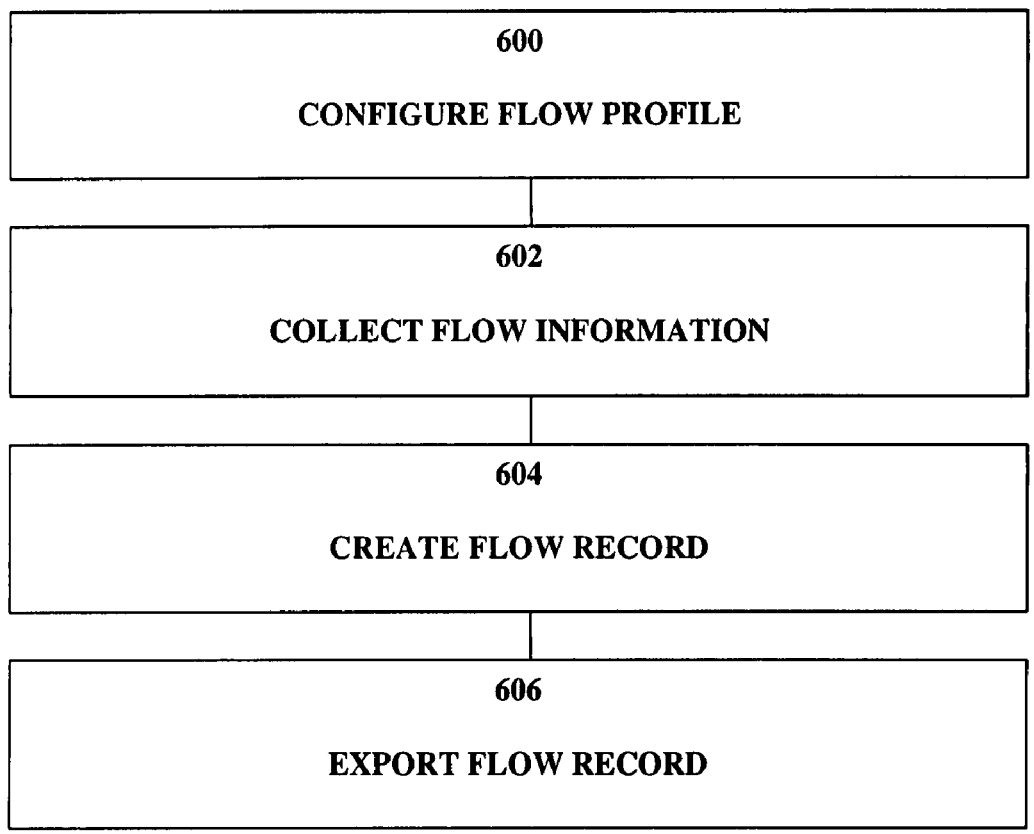
FIG. 6 is a flow diagram illustrating in more detail the approach described herein.

FIG. 6 is a flow diagram showing steps in more detail implemented according to the present approach. Although reference is made, in the specific embodiments herein, to approaches and terms relevant to the Cisco NetFlow™ product, the approach as described herein can be implemented in relation to any flow collection process. For example, embodiments may be used with "IPFIX" or the "Architecture for IP Flow Information Export" the current version, version 12 of which is described in the document "draft-IETF-IPFIX architecture-12" of the directory "internet-draft" of the domain "ietf.org" of the worldwide web, the contents of which are incorporated by reference fully described herein.

The approach of FIG. 6 can be understood with reference to FIG. 2, which depicts an illustrative network to which the method is applied. The network includes a first AS, AS1 210 including nodes 212, 214, 216 having respective IP addresses. A further AS, AS2 reference numeral 220, includes nodes 218, 224, 226, 227. Two further AS's, AS3, reference numeral 240 and AS4, reference numeral 242 include respective nodes 222, 230. Where node 212 in AS1 sends a packet destined, for example, for node 222 in AS3, the packet is routed via node 218 in AS2 to node 224 in AS2 and then to node 222 in AS3. Where node 212 forwards a packet destined for node 230 in AS4 this is forwarded via node 218 in AS2 to node 226 in AS2 and then to node 230. Node 218 includes input and output interfaces 217, 219 respectively.

Where the node 218 acts as flow monitoring node, that is, a traffic flow monitoring functionality is enabled, packets passing through the node are classified into respective flows dependent on characteristic or field values ("flow keys"), as described above. Referring to the example described with reference to FIG. 1B, which is formulated purely for the purposes of explanation and is not limiting, it will be seen that, where node 214 has an IP address value SA1 and node 212 forwards packets from node 214 to node 222 in AS3 which has IP address value DA1, then these packets are classified into the first flow 38 in FIG. 1B. However where packets are directed from node 214 to node 230 in AS4 having destination IP address value DA2 then this is classified into the second flow 40 shown in FIG. 1B, providing the flow profile described above. It will be appreciated that any additional or alternative fields, characteristics or address types can be taken into account in classifying flows. It will further be seen that multiple monitors or Observation Points can be included, for example at each of the input and output interfaces 217, 219.

As described above, in conventional systems the flows are cached and periodically exported to a collector node shown as node 227 in FIG. 2 which is shown in AS2 but may be at any appropriate part of the network. Although aggregations may take place these are not in real time and are carried out according to predefined complex aggregation schemes.

Accordingly where node or router 218 acts as a classifying node or monitor or Observation Point, packets arriving on an interface are characterized according to the configured flow profile. Of course characterization of the packet can be taken as the packet arrives or leaves or both depending on where the packets are monitored, that is where the Observation Points are located. For example in the case of multi-cast replication or in fragmentation cases the values at input and output may be different in which case capture of both may be desirable. It will be noted that where the router has several monitors each can capture different flow data at one or more respective Observation Points and send it to different collectors allowing further flexibility according to the approach described herein.

Referring now to FIG. 6, at step 600 user configuration of a flow is provided by creation of a flow profile. In one embodiment appropriate instructions and options are presented to the user for example through a command line interface (CLI) or other appropriate graphical user interface (GUI). For example this may be performed by a user at run-time or at start up of a device. Alternatively a configuration can be prepared in advance and read by the device at start-up or in runtime. The user can select, for example, which interfaces to monitor and then select the key fields and non key fields required to provide the desired flow information. In addition or alternatively the user may be presented with one more existing flow profiles and the corresponding definitions and the user may select or modify an existing profile. The key fields can include, but are not restricted to: Any field from the packet headers including MPLS, IPv4, IPv6, UDP, TCP, ICMP, IGMP; fields from the layer 2 header, including VLAN ID, header size, payload size, MAC Source Address, MAC Destination Address; the time (relative or absolute) the initial and most recent packet was seen in a flow; the ID or name of the input and output interface; the AS number of the BGP network a flow came from or is going to; the AS number of the neighbor BGP network a flow was routed from or will be routed to; the class of the flow as per internal classification routines; the ID of any sampling strategy; the IP address of a next hop; and a packet chunk.

In addition non-key fields may be selected from the candidate list of key fields (of course selected key fields are typically but not essentially not also selected as a non-key field) and can also include packet and byte counters for input, output and multicast replication maximum/minimum length or time to live (TTL), and a list of the TCP flags seen through the duration of the flow together with any other flow related information.

At step 602 flow information is collected from packets received at the router or in relation to those packets and any internal information about the router or forwarding system that is not derived from the packet itself. The manner in which this is achieved can be in any appropriate form for example as currently performed by the Cisco NetFlow™ product. In particular if the key field values for a received packet match those of an existing flow then the packet is added to the existing flow. If the key field values do not correspond to an existing flow then a new entry is created in the cache and consequently updated when subsequent correspondent packets are received.

At step 604 a flow record is created (or updated). Again this may be in any conventional manner for example obtaining the relevant information from the or in relation to packet including non-key information such as packet length and/or time of arrival depending on the user configuration, the packet itself then being forwarded on as normal. In addition packet information such as relevant segments of the payload itself can be stored as key or non-key information within the flow record which can be useful, for example, for purposes of monitoring packet information for security reasons. It will be noted that in some cases the non key field value received from the first packet can be used for all subsequent packets in the flow as it will be the same for all packets, for example, for non-key field such as source address of the given flow or ToS. Alternatively the non key field information may change for each packet within the flow and more values may require storing, for example in the case of TCP flags.

At step 606 the flow record is exported. Because only the flow record is exported, only those packet parts configured to be collected are exported to a collector. This can be achieved using known export approaches such as that used in the Cisco NetFlow™ product, IPFIX or in any other appropriate form. Export can take place immediately, or after a predetermined duration, such as a predetermined active period or a predetermined period of inactivity for a flow. The record can be exported and the cache entry corresponding to the record at the monitor flushed immediately or alternatively the cache entry can be maintained at the monitor permanently. It will be appreciated that the manner in which the flow records are exported and stored at the monitor can be user configurable. According to another aspect the approach allows a cache to obtain key/non-key information and export it immediately to the collector without grouping it with other packets in to a flow although the information is sent as a flow record relating to a single packet. As a result instantaneous export can be implemented in the context of the flexible flow configuration described above allowing, for example, service level agreement (SLA) checks to see how long it takes a packet to traverse the full network. In addition these flows can be cached allowing the user to see the history of what has been monitored when required for operation.

It will be appreciated that the use of "flow" in networks is not restricted to flow accounting and a configurable definition of what makes a flow may be of use for many features. The flexible flow definitions are not restricted to IP traffic and can easily be used with any packet based network traffic including, but not restricted to IPv4 and, IPv6 and MPLS networks. For example the approach can be used to gather traffic information for use in detecting denial of service attacks, intrusion detection, network usage and planning and any other application requiring monitoring and managing a packet based network such as IP.

The manner in which the specific steps can be performed can be implemented in any appropriate way as will be apparent to the skilled person for example in software, hardware or firmware. For example the flow configuration steps can be performed in any appropriate manner as can the creation of flow record and export steps as a result As a result of the approaches described herein, the key fields for a flow and what parts of a packet requiring capture for the flow can be configured flexibly in relation to data traffic through the router. Because only relevant parts of the packets are sent to the collector bandwidth and storage requirements are reduced and flow information can be configured to a particular service or operation in the network by the user. As a result high capacity recognition including scalability and aggregation of the flow information is provided allowing, for example, flow infrastructure security monitoring, denial of service detection and identification and a single technology to cover flow accounting means providing a cohesive and flexible method for analyzing packet flow in IP networks as well as networks operating under other systems such as routing vector and multi-protocol label switching (MPLS). It will be seen that the feature can be used to replace and augment a range of existing required accounting features such as IP accounting, BGP policy accounting and so forth.

The approach can be used in conjunction with aggregation techniques but allows a provision of additional data which may be required by the user and which would otherwise be lost in aggregation techniques which could be collected on the router before export.

It will be appreciated by the skilled reader that the steps described herein can be implemented in any appropriate manner, for example by incorporating appropriate code into an existing flow monitoring application such that detailed description is not required herein.

4.0 Implementation Mechanisms—Hardware Overview

Figure 7:
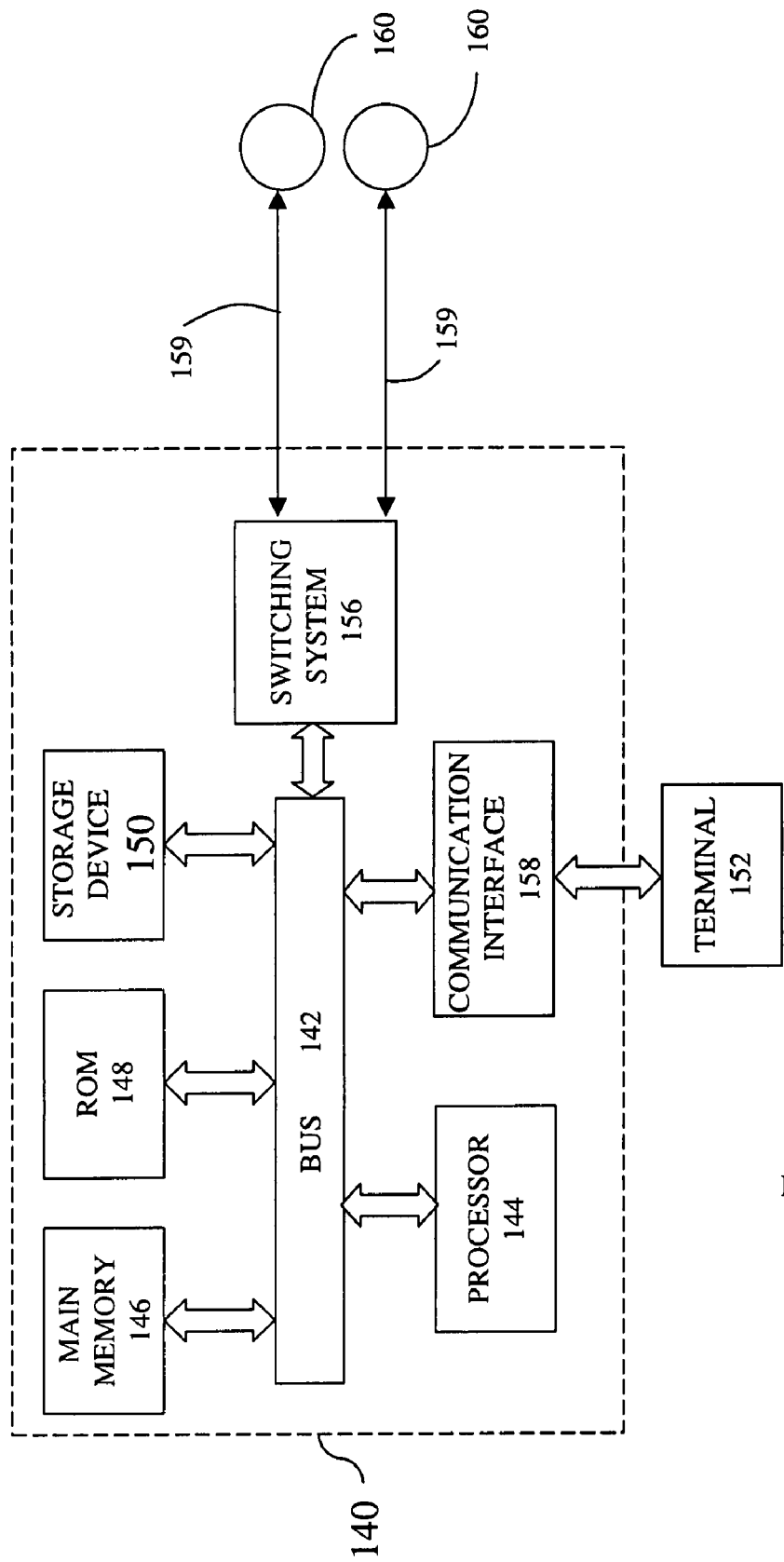
FIG. 7 is a block diagram illustrating a computer system upon which a method as described herein may be implemented.

FIG. 7 is a block diagram that illustrates a computer system 140 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with one or more buses 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a USB or a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router or monitor or collector the above described method. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multiprocessing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile storage media, volatile storage media, and transmission media. Non-volatile storage media includes, for example, optical or magnetic disks, such as storage device 150. Volatile storage media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other storage medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application can provide for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Aspects or examples or embodiments described can be juxtaposed or interchanged as appropriate.

It will be appreciated that the approach described herein can be applied in any appropriate network, any protocol and on any appropriate network component in relation to any data type or element.

What is claimed is:

1. A computer system for collecting network traffic information, comprising:
   one or more processors;
   one or more non-transitory devices storing information which, when received by the one or more processors, causes the one or more processors to perform:
   receiving a network traffic element including a plurality of fields, the plurality of fields including one or more key fields having a respective key field value;
   classifying a received network traffic element into one of a plurality of flows dependent on the key field value of one or more key fields defined by a flow profile;
   creating a flow record and exporting the flow record to a collecting node;
   wherein the flow profile identifies one or more non-key fields of the plurality of fields in the network traffic element, wherein the one or more non-key fields are different than the one or more key fields defined by the flow profile used for classifying the received network traffic element, and wherein the one or more non-key fields are not used for classifying received network traffic elements into a flow;
   storing, in the flow record, the one or more non-key fields identified by the flow profile but not one or more other fields of the plurality of fields in the network traffic element;
   in response to user input that selects the one or more other fields, varying the flow profile to include the one or more other fields as part of the one or more non-key fields that are stored in the flow record that is exported to the collecting node, wherein fields of network traffic elements that are identified by the flow profile are stored in the flow record that is exported to the collecting node.

2. The computer system as claimed in claim 1 in which the one or more key fields includes at least one of a packet header field, header size, payload size, source address, destination address, time of receipt, input interface, output interface, autonomous system number, flow class, sampling strategy identification, or next hop address.

3. The computer system as claimed in claim 1 in which the one or more non key-fields include respective non-key field information, in which the one or more non-key fields comprises at least one of a packet header field, header size, payload size, source address, destination address, time of receipt, input interface, output interface, autonomous system number, flow class, sampling strategy identification, or next hop address, packet counter, byte counter for input, output and multicast replication, TCP flag list and packet payload segment.

4. The computer system as claimed in claim 1, wherein the one or more non-transitory devices further store information which, when received by the one or more processors, causes the one or more processors to perform receiving configuration information to vary the flow profile by selection from one or more candidate key fields.

5. The computer system as claimed in claim 1, wherein the one or more non-transitory devices further store information which, when received by the one or more processors, causes the one or more processors to perform receiving configuration information configurable to vary the flow profile by selection from one or more candidate non-key fields.

6. The computer system as claimed in claim 1, wherein the one or more non-transitory devices further store information which, when received by the one or more processors, causes the one or more processors to perform receiving user configuration information to vary the flow profile.

7. The computer system as claimed in claim 1 in which the computer system comprises a network traffic element router that comprises one or more monitors each including one or more Observation Points for observing network traffic elements.

8. The computer system as claimed in claim 1 in which the computer system comprises a network traffic element router and in which the respective Observation Points classify received network transfer elements into flows defined by respective flow profiles.

9. The computer system as claimed in claim 1 in which the computer system comprises a network traffic element router and in which an Observation Point is provided at each of an input and output interface of the router.

10. A computer-implemented method of collecting network traffic information at a router, comprising:
receiving a network traffic element including a plurality of fields, the plurality of fields including one or more key fields having respective key field values;
using the router, classifying the received network traffic element into one of a plurality of flows dependent on the key field value of one or more key fields defined by a flow profile;
creating a flow record and exporting the flow record to a collecting node;
wherein the flow profile identifies one or more non-key fields of the plurality of fields in the network traffic element, wherein the one or more non-key fields are different than the one or more key fields defined by the flow profile used for classifying the received network traffic element and wherein the one or more non-key fields are not used for classifying received network traffic elements into a flow;
storing, in the flow record, the one or more non-key fields identified by the flow profile but not one or more other fields of the plurality of fields in the network traffic element;
in response to user input that selects the one or more other fields, varying the flow profile to include the one or more other fields as part of the one or more non-key fields that are stored in the flow record that is exported to the collecting node, wherein fields of network traffic elements that are identified by the flow profile are stored in the flow record that is exported to the collecting node.

11. The method as claimed in claim 10 in which the one or more non-key fields include respective non-key field information, in which the one or more non-key fields comprises at least one of a packet header field, header size, payload size, source address, destination address, time of receipt, input interface, output interface, autonomous system number, flow class, sampling strategy identification, or next hop address, packet counter, byte counter for input, output and multicast replication, TCP flag list and packet payload segment.

12. The method as claimed in claim 10, further comprising receiving configuration information to vary the flow profile by selection from one or more candidate key fields.

13. The method as claimed in claim 10, further comprising receiving configuration information to vary the flow profile by selection from one or more candidate non-key fields.

14. A non-transitory computer readable storage medium comprising one or more sequences of instructions for collecting network traffic information and which instructions, when executed by one or more processors, cause the one or more processors to perform:
receiving a network traffic element including a plurality of fields, the plurality of fields including one or more key fields having respective key field values;
classifying the received network traffic element into one of a plurality of flows dependent on the key field value of one or more key fields defined by a flow profile;
creating a flow record and exporting the flow record to a collecting node;
wherein the flow profile identifies one or more non-key fields of the plurality of fields in the network traffic element, wherein the one or more non-key fields are different than the one or more key fields defined by the flow profile used for classifying the received network traffic element and wherein the one or more non-key fields are not used for classifying received network traffic elements into a flow;
storing, in the flow record, the one or more non-key fields identified by the flow profile but not one or more other fields of the plurality of fields in the network traffic element;
in response to user input that selects the one or more other fields, varying the flow profile to include the one or more other fields as part of the one or more non-key fields that are stored in the flow record that is exported to the collecting node, wherein fields of network traffic elements that are identified by the flow profile are stored in the flow record that is exported to the collecting node.

15. The method as recited in claim 10, in which the one or more key fields includes at least one of a packet header field, header size, payload size, source address, destination address, time of receipt, input interface, output interface, autonomous system number, flow class, sampling strategy identification, or next hop address.

16. The computer readable storage medium as claimed in claim 14 in which the one or more non-key fields include respective non-key field information, in which the one or more non-key fields comprises at least one of a packet header field, header size, payload size, source address, destination address, time of receipt, input interface, output interface, autonomous system number, flow class, sampling strategy identification, or next hop address, packet counter, byte counter for input, output and multicast replication, TCP flag list and packet payload segment.

17. The computer readable storage medium as claimed in claim 14, wherein the instructions, when executed by the one or more processors, cause the one or more processors to perform receiving configuration information to vary the flow profile by selection from one or more candidate key fields.

18. The computer readable storage medium as claimed in claim 14, wherein the instructions, when executed by the one or more processors, cause the one or more processors to perform receiving configuration information to vary the flow profile by selection from one or more candidate non-key fields.

19. The computer readable storage medium as recited in claim 14, in which the one or more key fields includes at least one of a packet header field, header size, payload size, source address, destination address, time of receipt, input interface, output interface, autonomous system number, flow class, sampling strategy identification, or next hop address.

* * * * *